Oct. 7, 1969                W. J. CHANCELLOR                3,470,669
           METHOD OF AND APPARATUS FOR SINGLING SEEDS FOR PLANTING
Filed Sept. 8, 1966                                    2 Sheets-Sheet 1
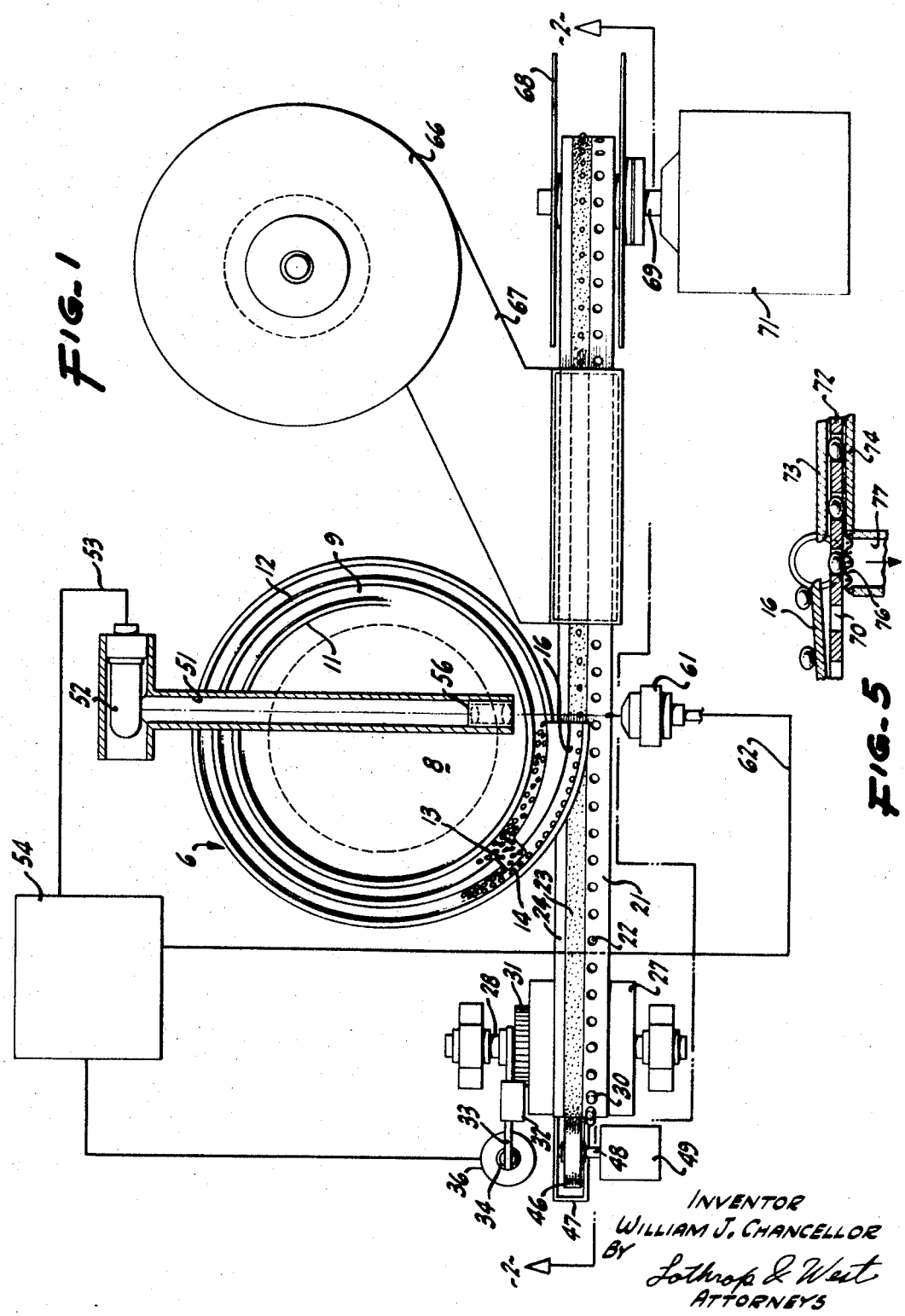
INVENTOR
WILLIAM J. CHANCELLOR
BY
Lothrop & West
ATTORNEYS Oct. 7, 1969  W. J. CHANCELLOR  3,470,669
METHOD OF AND APPARATUS FOR SINGLING SEEDS FOR PLANTING
Filed Sept. 8, 1966  2 Sheets-Sheet 2
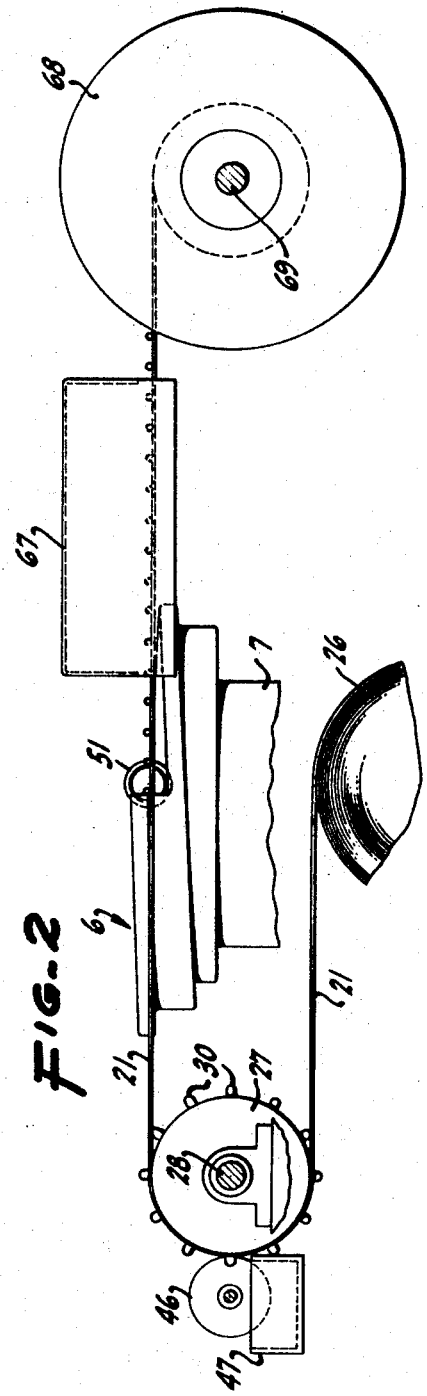
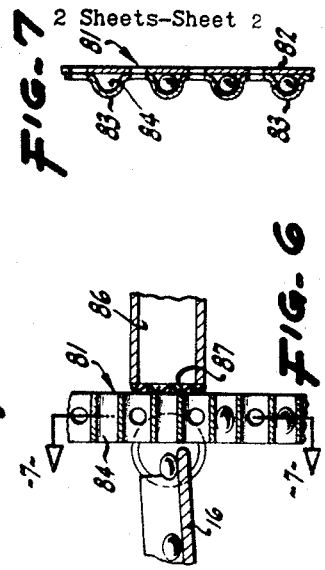
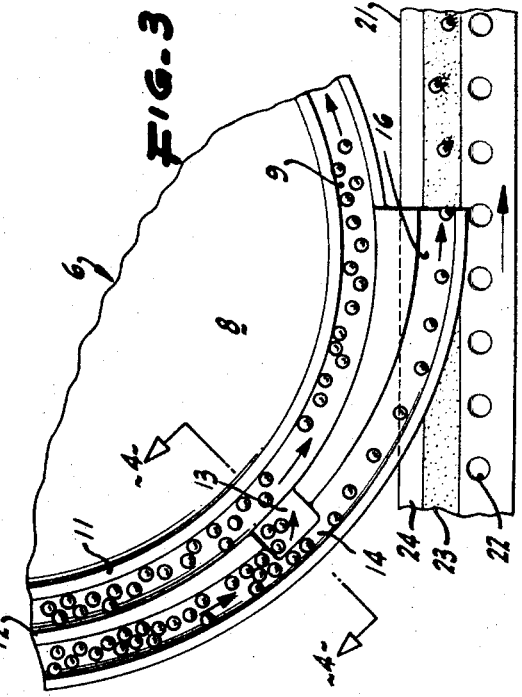
INVENTOR
WILLIAM J. CHANCELLOR
BY
Lothrop & West
ATTORNEYS

United States Patent Office 3,470,669
Patented Oct. 7, 1969

3,470,669
METHOD OF AND APPARATUS FOR SINGLING SEEDS FOR PLANTING
William J. Chancellor, Davis, Calif., assignor to The Regents of the University of California, Berkeley, Calif.
Filed Sept. 8, 1966, Ser. No. 578,087
Int. Cl. B65b 57/12, 9/04, 1/10
U.S. Cl. 53—35          5 Claims

ABSTRACT OF THE DISCLOSURE

Small seeds in bulk are singled for planting by being led along a path having a portion wide enough for only one seed at a time. A single seed in emerging from that portion of the path actuates a photo-cell that advances a tape into a selected position to catch the emergent seed in a selected location.

---

In planting many crops from seeds; for example, lettuce, it is important to separate the seeds, normally available in bulk, into individuals so that each individual seed can be planted in a particular location to have the particular spacing desired. Various ways of accomplishing this result have been attempted, but so far as I am aware there is no good system for separating a large mass or bulk of seeds into individuals that can readily be handled for planting in appropriate, separate locations without depriving the seeds of oxygen or being somehow deleterious.

It is therefore an object of my invention to provide a method of and apparatus for cheaply, expeditiously and accurately singling seeds for planting purposes and without adverse effects upon the seeds.

Another object of my invention is to provide a method of treating bulk seeds so that they automatically are segregated or separated into discrete individuals spaced with regard to each other so that when planted they grow into plants having the desired spacing.

Another object of the invention is to provide an apparatus into which bulk seeds can be fed and which will provide, as an end product, those same seeds arranged in appropriate relationship for planting and preferably held in that relationship to each other so that they can be handled and stored as an orderly or spaced group.

Another object of the invention is to provide an improved method for handling seeds for planting and an improved apparatus for handling seeds for planting.

The method is practiced in connection with the apparatus shown in the accompanying drawings, in which:

FIGURE 1 is a plan, partly schematic, of an apparatus for singling seeds constructed pursuant to the invention;

FIGURE 2 is a cross section, the various planes of which are indicated by the lines 2—2 of FIGURE 1;

FIGURE 3 is an enlarged plan of part of the vibrating head forming some of the apparatus;

FIGURE 4 is a cross section to an enlarged scale on the line 4—4 through the mechanism of FIGURE 3;

FIGURE 5 is a cross section somewhat diagrammatic showing a modified form of apparatus for lodging individual seeds in individual tape apertures;

FIGURE 6 is a cross section somewhat diagrammatic showing a further modified form of apparatus for lodging individual seeds in pockets in a tape; and FIGURE 7 is a cross section, the plane of which is shown by the line 7—7 of FIGURE 6.

In a practical and preferred form the apparatus pursuant to the invention includes a number of units arranged on a frame or support not illustrated in detail but serving to hold the parts in their desired relative locations. Included in the mechanism is a vibrating head 6. This includes a pedestal 7 containing an unbalanced drive motor or comparable mechanism (not shown) which is effective to impart a relatively high frequency vibration to the head 6. The head itself is a circular arrangement in plan having a relatively flat central area 8 from which gradually ascends a path 9 of sufficient width to accommodate a number of seeds side by side. The path is preferably defined on both sides by a wall 11 having an adjacent portion 12. In fact these walls are arranged in a spiral configuration, emerge from the plane of the central portion 8 and gradually ascend alongside and confining the path 9. There is thus provided a rising spiral path having its lower end approximately on a diameter of the central area 8 of the vibrating head 6 and continuing for several turns. In the use of this device, bulk seeds are dumped on the central area 8. When the device is vibrated seeds ascend the path 9 in substantial numbers, being arranged at random and usually shaking down to a band of but one seed in thickness but with several seeds side by side.

The path 9 continues to ascend uniformly through several turns but at one point it is intercepted by a radially arranged chute 13. The chute extends downwardly through an interrupted portion of the wall portion 12 of the spiral path. The upper margin of the chute intersects the path 9 so as to leave only a narrow ledge 14 barely of sufficient width to accommodate a single one of the seeds. The chute 13 is inclined downwardly from an upper portion of the path 9 to a lower portion of the path, as shown in FIGURE 1. As an alternative, the chute 13 can be made to extend even to the central planar portion 8.

In the operation of this structure, as the multiple seeds ascend the relatively wide path they eventually encounter the chute 13. Those seeds which can advance along or on top of the ledge 14 continue to do so, but the ledge is so narrow that such seeds must be in file and cannot be arranged alongside each other. Those that tend to arrange themselves alongside are on the chute. The inclination of the chute is such as to lower the seeds by gravity onto a lower portion of the path for recirculation.

The result of the foregoing mechanism is to provide but a narrow path for a single line of seeds on the portion of the vibrating head beyond the chute 13. Stated differently, the seeds passing along the ledge 14 necessarily must advance in single file and remain in single file on the remaining portion 16 of the path 9.

Means are particularly provided for receiving the seeds made single in the vibrating head and furthermore for spacing such seeds at a substantially uniform interval. For that reason there is provided on the principal support or separately, if desired, a mechanism for holding and for advancing a special tape 21. This tape is a flexible band of substantially uniform width and relatively small thickness and which has a series of perforations 22 therein at appropriate intervals. The tape likewise is preferably faced, at least on one side, with an adhesive strip or coating 23 leaving a side margin 24 uncoated. The tape is stored normally upon a supply roll 26 (FIG. 2) from which it is withdrawn under tension and under the control of a release wheel 27 mounted on an appropriate shaft 28. The wheel 27 about its periphery has a number of radial projections 30 designed to interfit with the openings 22 in the tape so that the wheel motion is accompanied by tape motion without slippage.

The shaft 28 likewise carries a ratchet 31 with which a step release 32 is adapted to engage. The release in turn is carried by an oscillating lever 33 journalled on the shaft 28 and advanced in an arcuate path by the movable core 34 of a solenoid 36. When the solenoid is energized the step release 32 allows the ratchet wheel 31 and the tensioned tape to advance one step. In this fashion the tape is advanced intermittently, the interval or distance of advance being regulated by the stroke of the solenoid core 34 and the pitch of the ratchet teeth.

While the tape may be originally supplied with adhesive, it is preferred to start with a non-adhesive tape and to apply the band 23 of adhesive by means of an adhesive wheel 46 bearing against the tape as it rounds the release wheel 27 and dipping into a supply of adhesive in a bath 47. The adhesive wheel 46 is mounted on a shaft 48 carried in a suitable support 49.

Means are provided to energize the solenoid in accordance with the presence of a seed at the discharge end of the path 9. For this purpose a tube frame 51 spans the vibrating head. The tube frame 51 carries a source 52 of illumination at one end, conveniently a suitable light globe. Electrical connectors 53 extend between the source and a power supply 54. The light from the source 52 travels through the tube 51 and through appropriate lenses 56 and emerges as a narrow beam falling upon a photosensitive cell 61 also connected by conductors 62 to appropriate mechanism with the power supply 54. Normally the light beam falls upon the light cell 61 and the energy is transmitted through the conductor 62 to a relay (not shown) or other mechanism which leaves the solenoid 36 de-energized.

When a seed emerges from the end of the path 9 on the portion 16 of the vibratory head, that seed interrupts the light beam and thus opens the circuit through the conductor 62, thus causing the solenoid 36 to be energized and to advance the tape one increment. The seed falls onto and is adhesively secured to a clean area of the tape and as successive single seeds energize the solenoid the tape continues to advance intermittently toward the right in FIGURE 1.

Although a relatively quick-drying adhesive is used, it is preferred to accelerate the drying, if necessary, by providing a blower 66 connected to a source of warm air or having heaters therein and having a discharge duct 67 to direct warm, dry air over the seed-bearing tape. The adhesive is thus dried as the tape advances onto a take-up reel 68. This is mounted on a drive shaft 69 connected through a slip drive to a motor 71 which continually imposes a take-up strain on the tape. The tape normally is urged to move from left to right in FIGURE 1 in increments or steps as released by successive actuations of the solenoid.

In the utilization of this apparatus, seeds in bulk are dumped onto the central portion of the vibrating head. The vibrating head is energized and some of the seeds progress up the spiral path 9 several abreast until such time as they have risen to a greater height in the outermost turn of the path 9. As the seeds come to the ledge 14, only single ones can advance thereover, the surplus falling down the chute 13 onto the lower portion of the spiral path for recirculation. A single file of seeds at random spacing then advances along the remaining part of the path 9 in the portion 16 and as each seed falls and interrupts the light beam, the tape is released one increment so as to present a fresh surface to the next seed that falls. Each falling seed is therefore spaced at equal intervals, approximately, from the preceding seed and lies in a straight line generally centrally of the tape. The seeds become attached to the tape as the adhesive dries under the influence of the warm air from the blower 66. The dried tape, bearing seed, is then wound upon the reel 68 in a fashion which does not bind or crush the seeds, but rather protects them since the film acts as a cover. When the reel 68 is full it is detached and replaced with an empty one.

From time to time the supply of tape on the reel 26 and the supply of seeds is replenished. It has been found in actual practice that a mechanism of this sort can be adjusted in time to produce almost any desired spacing of seed on a tape in a single file and with very few, if any, duplications and with no omissions, since the tape does not advance until such time as a seed falls to permit it to advance.

It is sometimes considered that previous ways of singling seeds; for example, pelletizing them, are not well accepted since the seeds so treated may be subject to irregularly delayed emergence and reduced levels of germination. This may be due to some deprivation of oxygen by reason of the coating or covering around the seed. The adhesive used to secure seeds to the tape may also have this disadvantage to a small degree.

To avoid adhesives, I can modify the apparatus, as shown in FIGURE 5, so that a seed leaving the end portion 16 of the vibrating head falls across the light beam, as before, but is received in a perforation 70 in the tape 72. Generally the tape 72 is similar to and is handled like the preceding tape, but has no adhesive. Rather, it travels for the most part between guide or confining walls 73 and 74 so that a seed once lodged within a perforation is confined until the tape is wound upon itself and may even have an outer wrapper not removed until the reel is ultimately used for seed planting.

Usually, the seed can simply fall into the perforation 70, but if further force is needed, I provide a screen support 76 even with the bottom wall 74 and spanning the end of a tube 77 connected to a vacuum source.

As an alternate, the tape 81 is varied to provide not only a base 82 or backing, but also a number of spaced loops 83 to form pockets 84 each designed to receive a single seed. The mechanism, although generally the same as before, is modified to advance the tape 81 in intermittent vertical steps. A seed leaving the end portion 16 of the vibrating head is drawn transversely into a registering pocket 84 in the tape 81 under the influence of a vacuum made available in a tube 86 having a screen end 87. The seed, once lodged, tends to remain in place by friction but, if desired, the walls of the pocket 84 can be slightly crimped or deformed so that even a loose seed cannot fall out as the tape is wound into a reel for storage or is unwound for cutting and planting.

What is claimed is:

1. A method of singling seeds for planting comprising providing a path having a first portion wide enough to carry several seeds side by side and having a second portion wide enough to carry only one seed, advancing seeds in bulk over said first portion and toward said second portion, advancing over said second portion only some of said seeds that have advanced over said first portion, retrieving some of said seeds that have advanced over said first portion and that are not advanced over said second portion, restoring said retrieved seeds to said first portion, and lodging individual ones of said seeds that have travelled over said second portion on a support at substantially equally spaced intervals.

2. An apparatus for singling seeds for planting comprising a vibrator head having an upwardly inclined path wide enough to carry several seeds side by side, means on said vibrator head forming a downwardly inclined chute intersecting said path and leaving a ledge portion thereof wide enough to carry but one seed, means for supplying seeds in bulk to one end of said path, means for supporting and advancing a tape beneath the other end of said path, means for detecting a seed adjacent said other end of said path, and means responsive to said detecting means for actuating said supporting and advancing means to advance said tape one step.

3. An apparatus for singling seeds for planting comprising means defining a path having one portion as wide as several seeds side by side and having another portion only as wide as one seed, means for advancing seeds in bulk along said path, means for supporting a seed retaining tape, and means responsive to a seed that has passed along said other portion for depositing said seed in a predetermined location with respect to said supporting means and on said retaining tape.

4. An apparatus as in claim 3 in which said supporting means is adapted to support a retaining tape having adhesive thereon.

5. An apparatus as in claim 3 in which means are provided for advancing said tape one step for each seed that has passed along said other portion.

References Cited

UNITED STATES PATENTS 2,523,517   9/1950   Potter _____ 53—59 X
3,114,448   12/1963  Boris _____ 198—220 X THERON E. CONDON, Primary Examiner E. F. DESMOND, Assistant Examiner U.S. Cl. X.R.

53—74, 246; 156—361, 552